United States Patent [19]

Jacobs et al.

[11] Patent Number: 4,785,363
[45] Date of Patent: Nov. 15, 1988

[54] CARTRIDGE ALIGNMENT MECHANISM FOR TAPE DRIVE

[75] Inventors: Lynn C. Jacobs, Carlsbad; Ronald D. Irvin, Poway; Karl B. Offerman, San Diego, all of Calif.

[73] Assignee: Cipher Data Products, Inc., San Diego, Calif.

[21] Appl. No.: 842,739

[22] Filed: Mar. 24, 1986

Related U.S. Application Data

[63] Continuation of Ser. No. 494,168, May 13, 1983, abandoned.

[51] Int. Cl.$^4$ .................. G11B 15/675; G11B 5/54; G11B 5/008; G11B 15/00
[52] U.S. Cl. .................. 360/93; 360/96.5; 360/105
[58] Field of Search .................. 360/85, 93, 95, 96.1, 360/96.5, 105; 242/198, 199, 197

[56] References Cited

U.S. PATENT DOCUMENTS

| | | | |
|---|---|---|---|
| 3,924,823 | 12/1975 | Cohen et al. | 242/198 |
| 3,987,486 | 10/1976 | Ito et al. | 360/96 |
| 4,004,752 | 1/1977 | Kamaya | 242/198 |
| 4,101,949 | 7/1978 | Cicatelli | 360/137 |
| 4,156,260 | 5/1979 | Joshi | 360/96.1 |
| 4,161,007 | 7/1979 | Haraguchi | 360/137 |
| 4,188,647 | 2/1980 | Tanaka | 360/105 |
| 4,337,908 | 7/1982 | Sims | 242/198 |
| 4,489,355 | 12/1984 | Rudi | 360/96.5 |
| 4,498,112 | 2/1985 | Georges et al. | 360/96.5 |
| 4,541,025 | 9/1985 | Sidhu et al. | 360/99 |
| 4,586,095 | 4/1986 | Olmsted | 360/93 |

FOREIGN PATENT DOCUMENTS

2739127 10/1978 Fed. Rep. of Germany ..... 360/96.5

Primary Examiner—Stuart N. Hecker
Assistant Examiner—Benjamin E. Urcia
Attorney, Agent, or Firm—Baker, Maxham & Jester

[57] ABSTRACT

A magnetic tape drive in which a tape cartridge is endwise loaded and thereafter minutely moved into a precision alignment position with respect to a read/write head. The drive has a support frame with a front panel and an elongate tray dimensioned to have the cartridge inserted endwise thereon. The tray is supported by the frame for longitudinal sliding movement from a retracted position in which the tray is contained within the frame to an extended position in which a portion of the tray extends through a slot in the front panel. A mechanism is provided for opening the access door of the cartridge while the cartridge is supported on the tray and the tray is being moved from its extended position to it retracted position. Another mechanism is provided for simultaneously moving the head and a capstan drive into engagement with the cartridge once it has been fully inserted and for also moving clamp mechanisms against the bottom plate of the cartridge to minutely move the cartridge against adjustable reference location pins.

16 Claims, 7 Drawing Sheets

CARTRIDGE ALIGNMENT MECHANISM FOR TAPE DRIVE

This is a continuation of application Ser. No. 494,168, filed May 13, 1983, now abandoned.

BACKGROUND OF THE INVENTION

The present invention relates to computer memory devices, and more particularly, to a magnetic tape drive in which a tape cartridge is endwise loaded and thereafter minutely moved into a precision alignment with respect to the read/write head.

U.S. Pat. No. 4,573,091, owned by Cipher Data Products, Inc., the assignee of the subject application, there is disclosed a cartridge tape drive which fits within a rectangular form factor measuring approximately three and one-quarter inches in height by five and three-quarter inches in width by eight inches in length. A magnetic tape cartridge defined by ANSI X3.55-1977 is endwise loaded into that drive. One cartridge meeting the aforementioned ANSI one-quarter inch tape cartridge standard is the DC600 or 300XL cartridge sold under the 3M trademark. See U.S. Pat. No. 3,692,255. The drive has an elongate tray dimensioned to have the cartridge inserted endwise thereon. The tray is supported within the housing for longitudinal movement from a retracted position in which the tray is substantially contained within the housing to an extended position in which a portion of the tray extends through a slot in the front panel of the housing. A mechanism is provided for opening the tape access door of the cartridge while the cartridge is supported on the tray and the tray is being moved from its extended position to its retracted position. A load lever is thereafter rotated to move a read/write head, and a capstan drive within the housing between operative engagement and disengagement with the cartridge.

In order to maximize the amount of data stored on the tape cartridge, data is written onto the tape in multiple, parallel tracks, one above the other with respect to the width of the one-guarter inch tape. The head is vertically reciprocated to select individual tracks. To insure data reliability, it is extremely important that the cartridge be precisely aligned with respect to the head. More specifically, the tape cartridge must be precisely aligned to achieve the azimuth and zenith relationships with the magnetic head required to insure data reliability. Furthermore, this precise alignment must be achieved upon each repeated insertion of a cartridge into the drive.

In order to insure interchangeable use of a tape cartridge on drives of different manufacturers, there are ANSI specifications which prescribe that the metal base of the one-quarter inch tape cartridge identified above be engaged at specific locations.

In the aforementioned U.S. Pat. No. 4,573,091, the cartridge is slid past leaf springs which deflect downwardly when contacted by the base plate of the cartridge and move the base plate up against cartridge location pins. Repeated sliding engagement of the cartridge with respect to the leaf springs and location pins can result in wear on the cartridge. Lifting the cartridge at points other than those specified by the ANSI standard can lead to distortion in the plate. Wear and distortion in turn can lead to alignment and interchangeability problems. The present invention provides a novel cartridge alignment mechanism which may be used in place of that disclosed in the aforementioned Ser. No. 441,762 application.

SUMMARY OF THE INVENTION

Accordingly, it is the primary object of the present invention to provide an improved cartridge tape drive.

Another object of the present invention is to provide an improved tape drive which will fit within the industry three and one-quarter inch by five and three-quarter inch by eight inch form factor for floppy disk drives while accommodating endwise loading of a standard cartridge defined by ANSI standard X3.55-1977.

Another object of the present invention is to provide a cartridge tape drive of the aforementioned type having an improved mechanism for aligning the cartridge with respect to the magnetic head.

Another object of the present invention is to provide a cartridge tape drive of the aforementioned type in which movement of a single actuator accomplishes engagement of the magnetic head and capstan drive with the tape cartridge and movement of the tape cartridge into precise alignment with the magnetic head.

Another object of the present invention is to provide a cartridge tape drive of the aforementioned type in which the azimuth and zenith relationships between the tape cartridge and magnetic head may be finely adjusted.

Another object of the present invention is to provide a cartridge tape drive of the aforementioned type having a frame structure which provides the entire mechanical support.

Still another object of the present invention is to provide a cartridge tape drive of the aforementioned type which can operate in three different orientations.

Still another object of the present invention is to provide a cartridge tape drive of the aforementioned type in which the cartridge can only be fully loaded if the cartridge is correctly oriented with respect to the drive.

Yet another object of the present invention is to provide a cartridge tape drive of the aforementioned type in which the cartridge support tray automatically slides to its extended position when the cartridge is removed from the drive to thereby prevent damage to the tape access door opening mechanism which might otherwise occur during cartridge re-load.

Another object of the present invention is to provide a cartridge tape drive of the aforementioned type in which the tape cartridge is contacted at ANSI specified locations and in the manner specified by the applicable ANSI standard to move the cartridge into alignment with the magnetic head.

Another object of the present invention is to provide a cartridge tape drive of the aforementioned type in which the alignment mechanisms are not in sliding contact with the cartridge when it is slid into the drive.

Still another object of the present invention is to provide a cartridge tape drive of the aforementioned type in which precise cartridge alignment is achieved without complex components and in the minimal space available within the floppy disk drive form factor.

Accordingly, the present invention provides a magnetic tape, drive in which a tape cartridge is endwise loaded and thereafter minutely moved into a precision alignment position with respect to a read/write head. The drive has a support frame with a front panel and an elongate tray dimensioned to have the cartridge inserted endwise thereon. The tray is supported by the frame for longitudinal sliding movement from a retracted position in which the tray is contained within the frame to an extended position in which a portion of the tray extends through a slot in the front panel. A mechanism is provided for opening the access door of the cartridge while the cartridge is supported on the tray and the tray is being moved from its extended position to it retracted position. Another mechanism is provided for simultaneously moving the head and a capstan drive into engagement with the cartridge once it has been fully inserted and for also moving clamp mechanisms against the bottom plate of the cartridge to minutely move the cartridge against adjustable reference location pins.

DESCRIPTION OF THE PREFERRED EMBODIMENT

Figures 1, 2, 3:
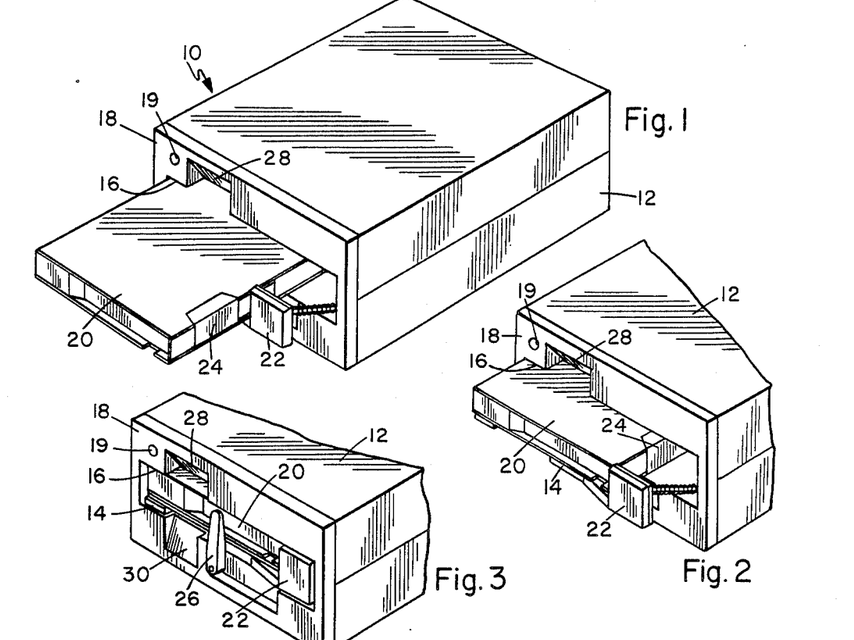
FIG. 1 is a perspective view of a preferred embodiment of the cartridge tape drive with its tray extended and a cartridge partially inserted.
FIG. 2 is a perspective view of the preferred embodiment with the cartridge fully inserted on the tray.
FIG. 3 is a perspective view of the preferred embodiment with the tray fully inserted and locked in position. The front panel and housing of the drive are not illustrated in the remaining drawing figures.

Referring to FIG. 1, the preferred embodiment 10 of the cartridge tape drive has a rectangular housing 12 whose width, height and length are such that the housing will fit within the industry form factor for five and one-quarter inch Winchester disk drives and floppy disk drives. A completely enclosed housing is not necessary where the drive is installed in a receptacle in a computer. Furthermore, in some cases the drive may be sold to OEM customers without a front panel. The tape drive of the present invention has a completely self-supporting frame structure so that it can be sold to OEM customers without any housing 12 and installed directly in personal and other small computers. As used herein, the term "within the frame" refers to structure being located generally within the two dimensional boundaries defined by the outer side edges of the frame components.

A horizontal tray 14 (FIG. 1) slides partially out of the tape drive through a slot 16 formed in a front panel 18 which is attached to the frame of the tape drive described hereafter. An LED 19 is mounted on the front panel to indicate the drive select status. The tray is dimensioned for receiving a magnetic tape cartridge 20 which is loaded endwise thereon. A small side panel 22 extends vertically from the right front corner of the tray. The tape cartridge 20 is preferably of the type which meets ANSI specification X3. 55-1977. One such cartridge is the model DC600 or 300XL sold by Minnesota Mining and Manufacturing Company.

The cartridge 20 is slid fully onto the tray 14 as illustrated in FIG. 2 so that the end edges of the cartridge generally coincide with the end edges of the tray. Thereafter, continued pushing on the cartridge 20 causes the tray to slide rearwardly until both the tray and the cartridge are entirely within the housing as illustrated in FIG. 3, or in the case where the drive has no housing, so that the tray and cartridge are within the frame of the tape drive, considering the front panel 18 in such case to be a part of the frame.

During the loading of the cartridge, mechanisms illustrated herein and described in detail in U.S. Pat. No. 4,573,091 open the tape access door 24 which is hingedly attached to one side edge of the tape cartridge 20. Once the cartridge is fully loaded into the drive, a load lever 26 (FIG. 3) is rotated approximately ninety degrees from a horizontal position into a vertical position. The load lever is connected to a linkage which causes a magnetic read/write head and a capstan drive (not visible in FIGS. 1-3) to move into engagement with the tape cartridge, as hereafter described in greater detail. This same rotation of the load lever also causes the tape cartridge to be moved slightly in a direction generally perpendicular to its plane and slightly laterally into a predetermined precise alignment position with respect to the magnetic head. In an actual embodiment of the cartridge drive which has been constructed, the tape cartridge is moved out of plane approximately thirty thousandths of an inch.

Figure 5:
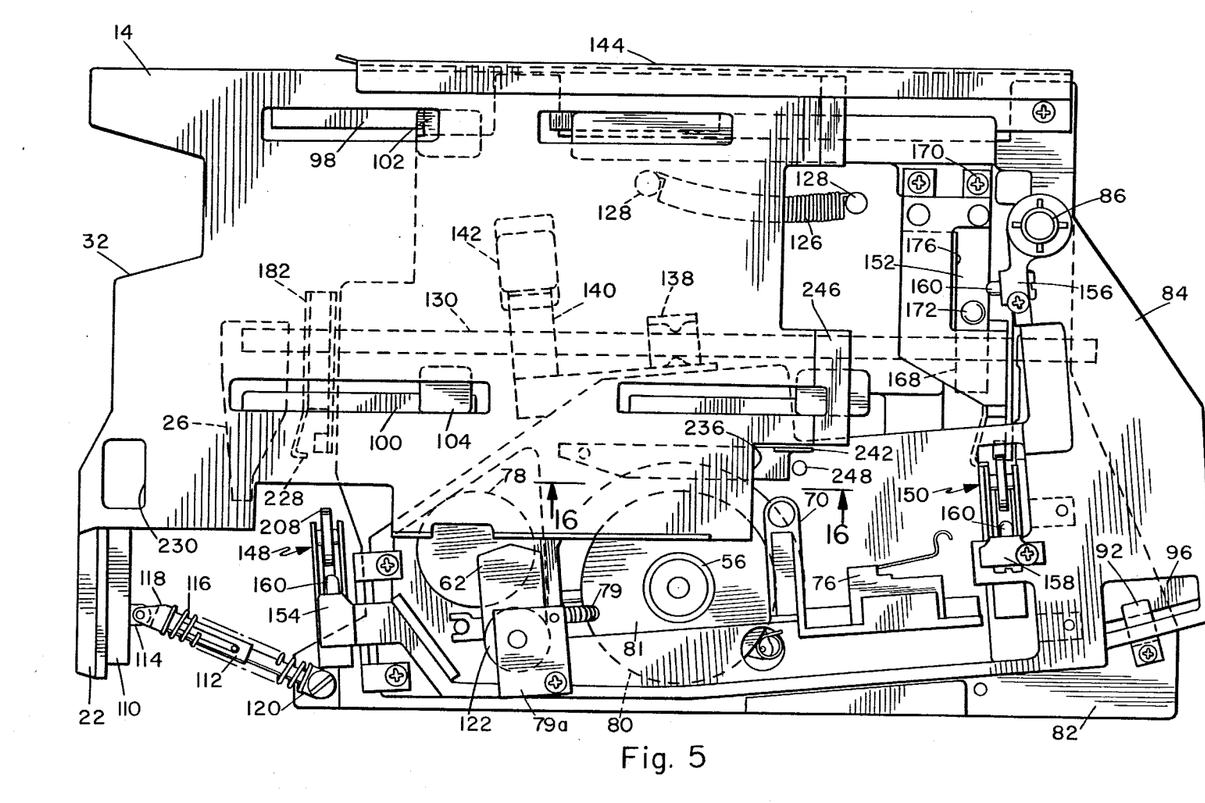
FIG. 5 is an enlarged top plan view of the tape drive illustrating its cartridge receiving tray in its extended position and its magnetic head carrying deck plate in its unengaged position.
Figure 6:
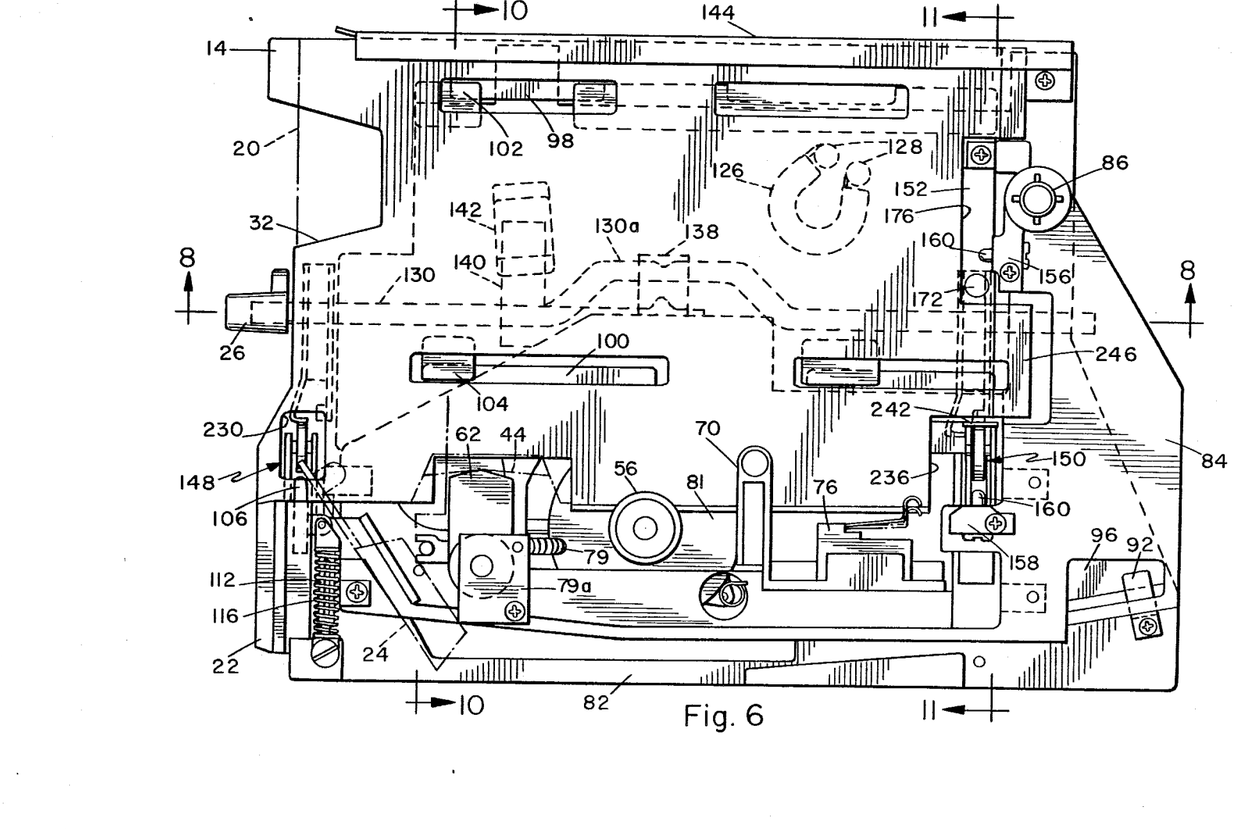
FIG. 6 is a view similar to FIG. 5 with the tray in its retracted or inserted position and with the deck plate in its engaged position.

The unlocked and locked positions of the load lever 26 are illustrated in phantom lines and solid lines, respectively, in FIGS. 5 and 6. When the load lever is in its vertical or locked position illustrated in FIG. 3, the load lever extends across the slot 16 in the front panel 18 to thereby prevent withdrawal of the tape cartridge 20. Detents and recesses, not illustrated, may be provided on the lever 26 and on the front panel 18 so that the load lever 26 snaps into its unlock and lock positions.

The front panel 18 (FIG. 3) of the tape drive is formed with upper and lower, inwardly tapering finger recesses 28 and 30 on either side of the slot 16. A similar recess 32 (FIG. 5) is formed in the forward end of the tray 14, in alignment with the finger recesses 28 and 30 (FIG. 3) of the front panel. These finger recesses permit an operator to grasp the end of the tape cartridge 20 between his or her thumb and index finger and to remove the cartridge from the tray. The load lever 26, after it is rotated to its locked position shown in solid lines in FIG. 3, blocks the entry slot 16. This lever thus provides assurance of full tray entry and also provides a visual "cartridged loaded" indicator.

Figure 4:
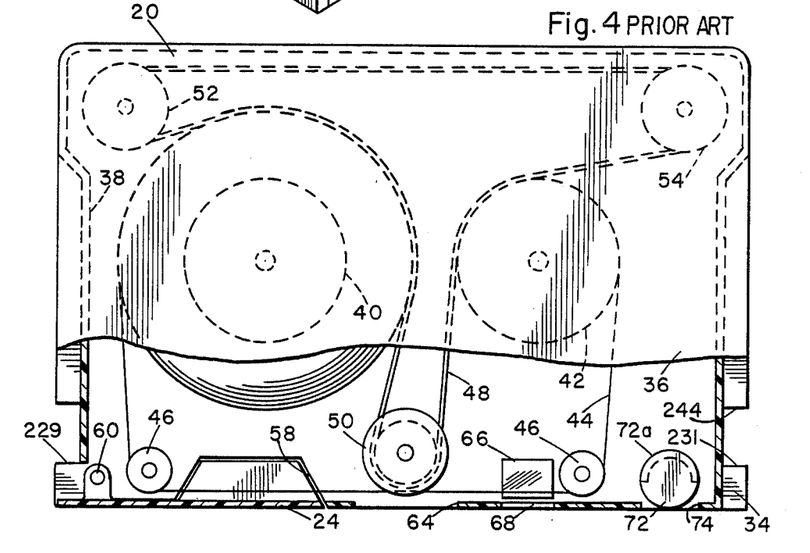
FIG. 4 is an enlarged top plan view of the tape cartridge utilized in conjunction with the preferred embodiment. The tape cartridge is illustrated with portions cut away and with the tape access door closed.

Details of the conventional tape cartridge 20 are illustrated in FIG. 4. That cartridge measures approximately six inches in length and four inches in width. The door 24 of the cartridge increases the width of the cartridge to approximately five and three-quarter inches when the door is fully opened. The door is spring biased to its closed position. The cartridge has a solid metal base plate 34, and a top clear plastic cover plate 36. The end walls 38 of the cartridge are slightly indented from the end edges of the plates 34 and 36. A pair of reels 40 and 42 are rotatably mounted within the cartridge between the plates 36 and 38. A length of magnetic tape 44 is wound back and forth between the reels around a pair of idler rollers 46. A drive belt 48 is driven around three separate rollers, 50, 52 and 54. When the belt capstan roller 50 is rotated by a capstan drive roller 56 (FIG. 5), the drive belt 48 rotates the reels 40 and 42 so that the magnetic tape is unwound from one of the reels and rewound onto the other reel.

The cartridge 20 (FIG. 4) has a cut-out region 58 along one side edge thereof which is conformably shaped for receiving the door 24. The door 24 is pivotally connected to the corner of the cartridge 20 by a hinge assembly 60. As previously indicated, when the tape cartridge 20 is inserted into the drive, mechanisms open the door 24 of the cartridge. Thereafter, rotation of the load lever 26 brings a read/write magnetic head 62 (FIG. 5) into the cut-out region 58 (FIG. 4) the appropriate distance so that the head contacts the tape 44 and the proper tape wrap angle is established as illustrated in FIG. 6.

Rotation of the load lever also brings the capstan drive roller 56 (FIG. 6) into a cut-out region 64 (FIG. 4) into contact with the belt capstan roller 50. As seen in FIG. 4, the belt capstan roller 50 has an upper larger portion and a lower smaller portion illustrated in phantom lines. The larger portion of the belt capstan roller 50 extends above and beyond the magnetic tape 44 so that the capstan drive roller 56 can engage the belt capstan roller 50 without touching either the tape 44 or the drive belt 48.

The cartridge 20 also has a mirror 66 (FIG. 4) positioned behind a window 68 which is utilized in connection with an end of tape/beginning of tape (EOT/BOT) sensing mechanism 70 (FIG. 6) in the tape drive. The cartridge 20 also has a file protect mechanism consisting of a rotatable half cylinder 72 (FIG. 4) positioned in front of a cut-out region 74 in the side wall of the cartridge. A file protect sensor in the form of a minature switch 76 (FIG. 5) determines whether the cut-out region 74 is blocked by the semi-circular portion 72a of the file protect cylinder As described in U.S. Pat. No. 4,573,091 the read/write head 62 is vertically reciprocable by energizing a stepper motor 78 (FIG. 5) to select any one of twelve different tracks on the tape. A coil spring 79 is compressed into a curved shape and connected between the magnetic head mount and the precision bearing support 79a to take up or eliminate slop or tolerance in the lead screw used to move the head. The capstan drive roller 56 is mounted on the upper end of the shaft of a brushless DC motor 80 (FIG. 5). A shield 81 surrounds the motor 80 to prevent magnetic forces of the motor from interfering with read and write operations. The shield 81 is preferably made of mu-metal or cold rolled steel to provide high magnetic flux absorption and low reluctance.

Electronic control circuitry for the tape drive is not described herein. Suitable examples of such circuitry are described in U.S. patent examples of such circuitry are and U.S. Pat. Nos. 4,541,019, and 4,541,019, both owned by Cipher Data Products, Inc., the assignee of the subject application. The electronic circuitry is mounted on one or more PC boards (not shown) which are supported by the frame horizontally above the cartridge so that the complete drive will fit within the five and one-quarter inch form factor for Winchester and floppy disk drives.

Figure 7:
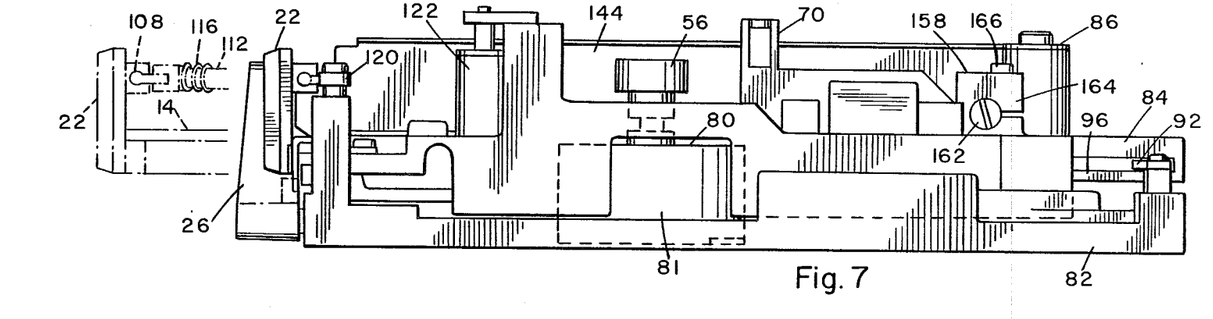
FIG. 7 is an elevation view of the side of the tape drive where the deck plate is mounted in overlying relationship with the base.

The frame of the tape drive includes the front panel 18 (FIG. 3), the tray 14, a base 82 (FIGS. 5 and 7) and a deck plate 84 (FIGS. 5 and 7). The base and deck plate may be made of cast Aluminum. The deck plate 84 has a generally L-shaped configuration (FIG. 5) with the end of its shorter leg connected to the rearward end of the base 82 by a precision vertical bearing assembly 86 (FIGS. 5 and 7). The capstan drive motor 80, the magnetic head 62 and the head moving stepper motor 78 are mounted on the longer leg of the L-shaped deck plate 84. Manual rotation of the load lever 26 ninety degrees from its horizontal position to its vertical position pivots the deck plate from its disengaged position illustrated in FIG. 5 to its engaged position illustrated in FIG. 6. A guide tab 92 (FIGS. 5 and 7) has one end screwed to the base 82 and its other end slides in a recess 96 formed in the rearward end of the deck plate 84. A similar guide tab and slot arrangement is located at the front end of the deck plate but is not visible in the drawings. These guide tabs insure that the deck plate rotates in a plane parallel to the base and they prevent any torgue action therebetween.

Figure 10:
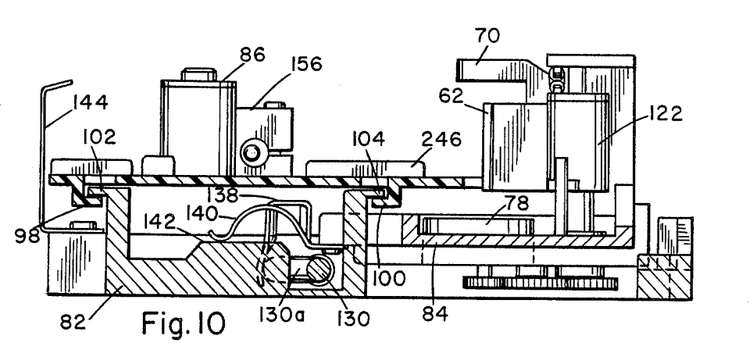
FIG. 10 is a cross-sectional view of the tape drive taken along line 10—10 of FIG. 6.

The underside of the tray 14 (FIG. 5) is formed with pairs of parallel, longitudinally extending L-shaped rails 98 and 100 (FIG. 10) which surround and guide the tray for longitudinal sliding movement along parallel tracks 102 and 104 formed in the base 82. Preferably, the tray is formed of a compound of DELRIN and TEFLON materials along with a glass fill to provide a strong, low friction sliding surface.

The cartridge tape drive described and illustrated herein has the same tape access door opening mechanism as that disclosed and claimed in U.S. Pat. No. 4,573,091. Briefly, a pin 106 (FIG. 15) is mounted within a horizontal slot 108 formed within a block 110 attached to the side panel 22 of the tray. The pin 106 is positioned so that its forward end can engage the rearward end 24a of the tape access door of the cartridge when the cartridge has been fully inserted onto the tray.

Figure 15:
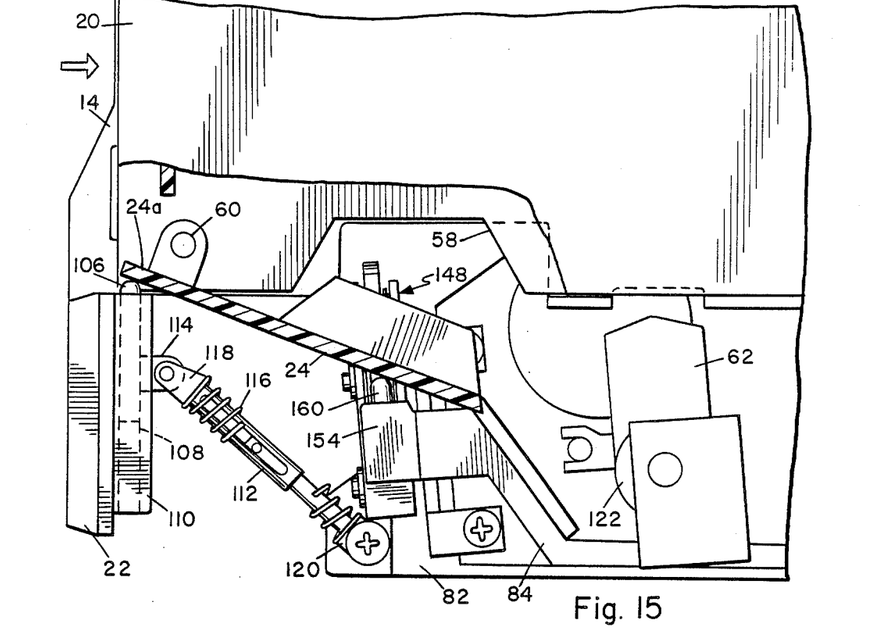
FIG. 15 is a greatly enlarged, fragmentary, top planar view illustrating the tape access door opening mechanism of the tape drive.

Linkage means are provided for connecting the pin 106 with the frame so that during inward movement of the tray to its retracted position, the pin will push against the rearward end 24a of the tape access door to open the same, as illustrated in FIG. 15. The linkage means includes a telescopic element 112 pivotally connected at one end to the base 82 and at the other end to an ear 114 connected to the pin 106. The telescopic element is surrounded by a coil spring 116. The coil spring is slightly compressed between pivotal connectors 118 and 120 at the ends of the telescopic element.

Initially, the cartridge is inserted onto the tray 14 as illustrated in FIG. 2. At this point, the tape access door 24 is still fully closed. Thereafter, the operator pushes on the forward end of the cartridge to push the tray to its retracted position in which both the tray and the cartridge are entirely within the frame as illustrated in FIG. 3. During this insertion, the telescopic element initially retracts in length somewhat. However, the force of the compressed coil spring 116 gradually moves the pin 106 into contact with the rearward end 24a of the tape access door 24. This causes the tape access door 24 to open as the tray is being pushed inwardly. As the door (spring biased closed) opens, it engages and cams around the reference pin 160 of the reference locator 154 at the forward end of the deck plate. The opening of the tape access door is indicated by the curved arrow in FIG. 15.

It should be understood that when the tray and the cartridge are being pushed into the drive, the deck plate 84 and thus the read/write head and the capstan drive mechanism carried thereby are in their disengaged position illustrated in FIG. 5. The various structures in the drive are dimensioned so that the tape access door follows a path that will just clear the head and its support bearing 122 (FIG. 15). The door is open just enough to permit the head to move into cut-out region 58 (FIG. 4) into contact with the tape.

The cartridge drive of the present invention is provided with a means for automatically moving the tray to its extended position after the cartridge has been withdrawn from the drive. This is important, since it prevents damage to the tape door opening mechanism. For example, assume that an operator were to remove the tape cartridge at the end of the day and that the tray did not automatically extend. The next morning, if the operator were to forget to withdraw the tray prior to insertion of the cartridge, the cartridge end would be rammed into the extended pin 106, possibly breaking the pin off or damaging other parts of the door opening mechanism. To prevent this, means are provided for automatically extending the tray upon withdrawal of the cartridge. Specifically, a coil spring 126 (FIG. 5) is connected between pins 128 extending from the underside of the tray 14 and the upper side of the base 82. When the tray is pushed in to its retracted position illustrated in FIG. 6, the coil spring 126 is compressed into a curved configuration. Upon withdrawal of the cartridge, the force of the compressed spring 126 is sufficient to overcome the light weight of the tray and thereby extend the same.

Figure 8:
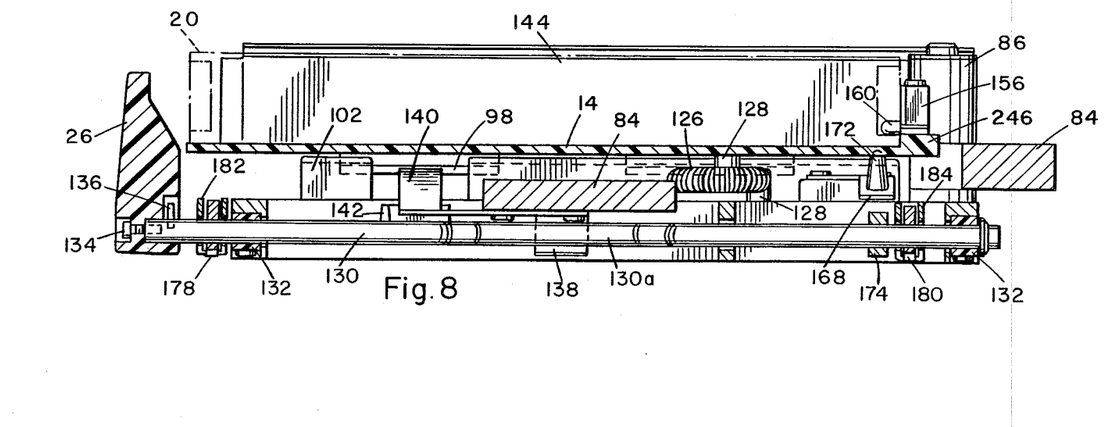
FIG. 8 is a longitudinal sectional view of the tape drive taken along line 8—8 of FIG. 6.

The mechanisms for moving the deck plate 84 and for tilting the cartridge into precise alignment will now be described. A crankshaft 130 (FIG. 6) extends longitudinally through the frame of the drive. As illustrated in FIG. 8, opposite ends of the crankshaft 130 are journaled in plastic bearings 132 snap fit into holes formed in opposite ends of the base 82. The load lever 26 is connected to the forward end of the crankshaft by a screw 134. A pin 136 in the load lever fits within a recess in the crankshaft to prevent relative rotation between the load lever and the crankshaft. The crank portion 130a (FIG. 6) of the shaft 130 rotates within a U-shaped downwardly opening springy clasp 138 (FIG. 10) bolted to the inner edge of the deck plate 82. The location of the clasp 138 is also visible in phantom lines in FIG. 6. When the load lever 26 is in its horizontal position illustrated in FIG. 5, the crank portion 130a of the crankshaft is located within the upper narrow portion of the clasp 138 and the deck plate is in its disengaged position illustrated in FIG. 5. Rotation of the load lever 26 to its vertical position illustrated in FIG. 6 causes the crank portion 130a of the crankshaft to move into its horizontal position illustrated in FIG. 10. In this position, the crank portion 130a is seated within the curved lower portion of the clasp 138. This movement of the crank portion 130a displaces the clasp 138 to the left in FIG. 10, thus rotating the deck plate into its engaged position illustrated in FIG. 6.

A semi-circular leaf spring 140 (FIGS. 5 and 10) extends from the clasp 138 connected to the inner edge of the deck plate 82. The curved portion of this leaf spring engages and is deflected by a ramp 142 formed on the upperside of the base 82. This holds the deck plate in its engaged position in the event that the tape drive is used in a vertical orientation, i.e., rotated ninety degrees clockwise or counterclockwise from the horizontal orientation illustrated in FIG. 10. A U-shaped wall 144 (FIGS. 5 and 10) is screwed to the left top edge of the base 82 and engages and holds the outer side edge of the cartridge in position when the tape drive is used in an orientation other than horizontal. A movable top guide mechanism (not illustrated) engages the top plate of the cartridge during insertion, see U.S. Pat. No. 4,573,091.

Figure 11:
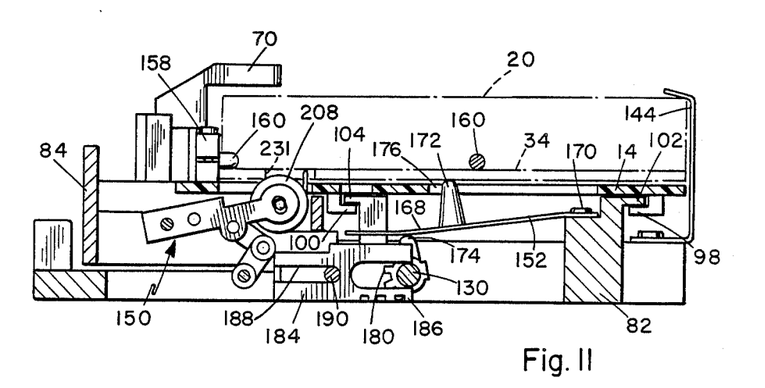
FIG. 11 is a cross-sectional view of the tape drive taken along line 11—11 of FIG. 6.

The tape drive further includes means for moving the cartridge within the frame generally perpendicular with respect to the plane of the cartridge into a predetermined precise registration or alignment with respect to the magnetic head. In the illustrated embodiment, such means include a pair of moveable roller clamps 148 and 150 (FIG. 5) and a movable spring clamp 152 (FIG. 11). Rotation of the load lever causes the clamps 148, 150 and 152 to move upwardly into engagement with the bottom plate 34 of the cartridge and to push the bottom plate of the cartridge against three reference locators 154, 156 and 158 (FIG. 5). In an actual embodiment of the tape drive which has been constructed, the roller clamps raise the side edge of the cartridge having the tape access door approximately thirty thousandths of an inch up and slightly to the right in FIG. 14.

Figure 9:
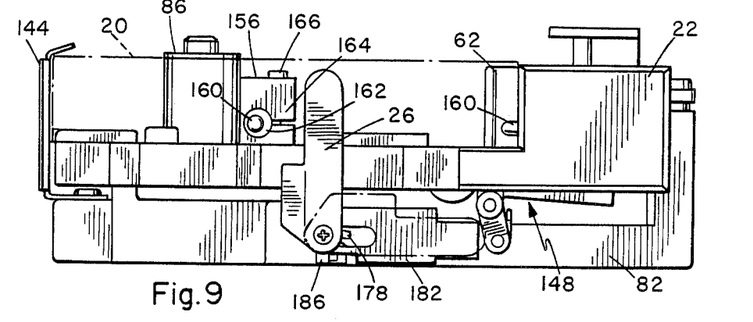
FIG. 9 is a front end elevation view of the tape drive.

Each of the reference locators has a cartridge location pin 160 (FIG. 9). These location pins engage and hold down the metal bottom plate 34 of the cartridge. The reference pin for front locator 154 is fixed and nonadjustable. It establishes a reference plane in conjunction with the adjustment of the two other reference locators. The reference location pins for rear locators 156 and 158 extend eccentrically from main cylindrical portions 162. In reference locators 156 and 158, the cylindrical body portion connected to each location pin is squeezed between a split block 164 held together by a screw 166. The screws may be loosened for locators 156 and 158 and the main body portions of their pins rotated via screw slots in their rearward ends to change the height of these location pins.

It should be noted that when the deck plate is in its engaged position as illustrated in FIGS. 5 and 6, the three location pins 160 engage the bottom plate 34 of the cartridge at three spaced apart locations per ANSI specification, two at opposite ends of the access door side edge of the cartridge and the other along the end edge of the cartridge. The cartridge is pushed up against the three location pins by the two roller clamps 148 and 150 and by the spring clamp 152. By pushing the cartridge up against three location pins, a triangulation is established which permits precise adjustment of the height and tilt of the cartridge relative to the magnetic head.

The spring clamp 152 (FIGS. 8 and 11) includes a leaf spring 168 having one end connected by a screw 170 to the base 82. A projecting element 172 extends from the upper side of the leaf spring 168 intermediate its length. When the load lever 26 is in its horizontal, unlocked position, the leaf spring 168 extends downwardly so that the upper end of the projecting element 172 is below the level of the underside of the tray 14. When a cartridge is inserted on the tray and the tray pushed into the drive, and the load lever is moved to its vertical, locked position, an arm 174 engages the free end of the leaf spring 168 and pushes the same upwardly. This moves the projecting element 172 upwardly into engagement with the bottom plate 34 of the cartridge 20.

There is a cut-out region 176 (FIG. 5) in the left rear edge of the tray which permits the projecting element 172 to be moved into engagement with the bottom plate of the cartridge. The projecting element 172 thus presses the bottom plate tightly against the location pin 160 of the reference locator 156. At the same time that the arm 174 moves the projecting element into contact with the bottom plate of the cartridge, the roller clamps 148 and 150 also engage edge 229 and 231 (FIG. 4), respectively, of the cartridge and push the cartridge upwardly to the right in FIG. 14, tightly against the location pins 160 and the side edges of the bases of the reference locators 154 and 158.

A pair of pinion gears 178 and 180 (FIGS. 8, 9 and 11) are mounted on the forward and rearward ends of the crankshaft 130. Each pinion gear need only have about half of its circumference toothed because of the ninety degree limit on the rotation of the crankshaft. Identical fork assemblies 182 and 184 (FIGS. 8, 9 and 11) each have four legs which extend on opposite sides of corresponding ends of the crankshaft and enclose respective ones of the pinion gears. The bottom two legs of each fork assembly are connected and define rack gears 186 which mesh with the pinion gears. Thus, the fork assemblies provide a captured rack and pinion gear drive. Each fork assembly such as 184 (FIG. 11) has a slot 188 which receives a guide post 190 which extends from the base 82. Thus, when the load lever 26 is rotated, each of the fork assemblies is displaced horizontally. The end of each fork assembly opposite from the pinion gear engages and drives a corresponding one of the roller clamps 148 and 150 and moves the same into engagement with the cartridge. The roller clamps 148 and 150 are not in a position to be driven by the fork assemblies until the deck plate 82 is moved to its engaged position illustrated in FIG. 6.

The construction and operation of each of the roller clamps is identical. Therefore, only the forward roller clamp 148 will be described in detail by way of reference to FIGS. 12-14. Referring to FIG. 13, the roller clamp 148 includes a main arm 192. The rearward end of the main arm 192 is pivotally connected by a fastener 194 to a bracket 195 (FIG. 12) which extends downwardly in front of the forward end of the deck plate 84. The bracket 195 has a pair of horizontally extending flanges 195a and 195b held by screws 196 to the deck plate. The rear roller clamp 150 is similarly connected to the rearward end of the deck plate.

Figure 12:
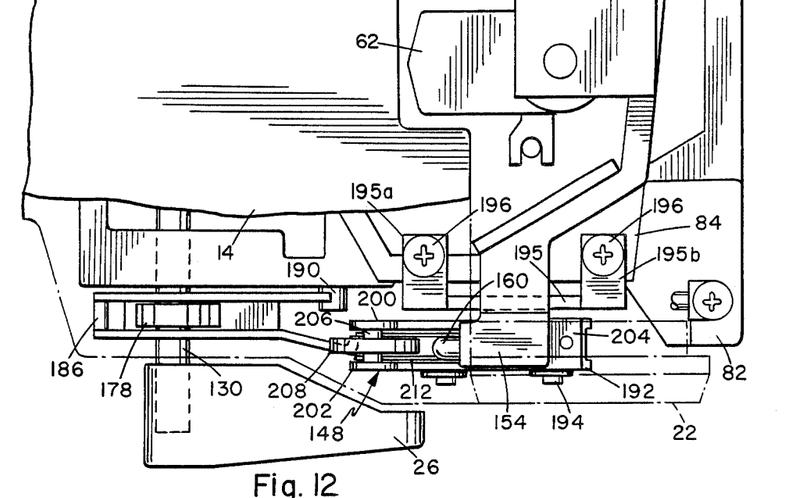
FIG. 12 is a greatly enlarged fragmentary, top plan view of the front right corner of the tape drive.
Figure 13:
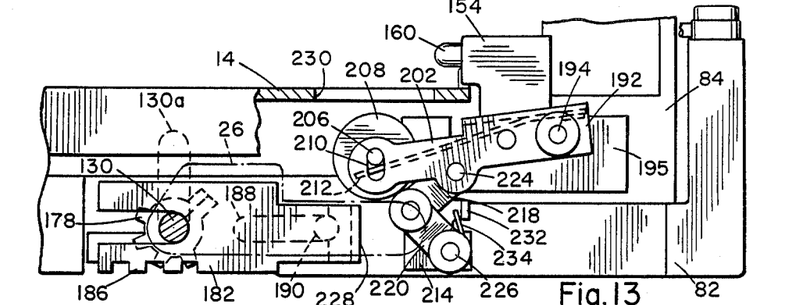
FIG. 13 is a greatly enlarged, fragmentary elevation view of the front right corner of the tape drive illustrating the front roller clamp in it disengaged position.

As best seen in FIG. 12 the main arm 192 includes a pair of spaced apart legs 200 and 202 connected by a top member 204 at their rearward ends. An axle 206 extends between the forward ends of these legs. The axle rotatably supports a wheel 208. As best seen in FIG. 13, the forward ends of the legs 200 and 202 have vertically extending slots 210 which receive the ends of the axle 206 and permit the axle and the wheel carried thereby to move upwardly and downwardly with respect to the main arm 192. A hairpin spring 212 biases the axle 206 and the wheel 208 towards their upper positions illustrated in FIG. 13.

The rearward end of the main arm 192 is pivoted about a shaft 194 which extends onto a bracket 195 (FIG. 12). The bracket 195 extends downwardly in front of the forward end of the deck plate 84. The bracket 195 has a pair of horizontally extending flanges 195a and 195b held by screws 196 to the deck plate. The rear roller clamp 150 is similarly connected to the rearward end of the deck plate.

A portion 214 of the bracket 195 extends downwardly from the deck plate through a recessed portion in the base 82 bounded by surface 216. A pair of small arms 218 and 220 (FIG. 14) are pivotally connected by a shaft 222. The upper end of the small arm 218 is pivotally connected to the main arm 192 intermediate its length by a shaft 224. The lower end of the small arm 220 is pivotally connected to the bracket extension 214 by a shaft 226. The roller clamp 148 can thus move between its retracted and extended positions illustrated in FIGS. 13 and 14 respectively.

Figure 14:
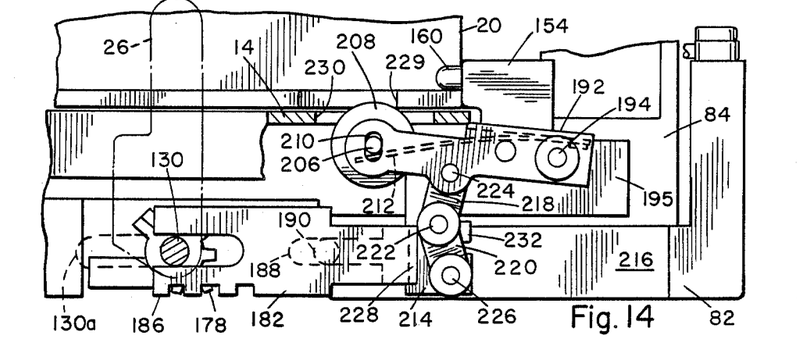
FIG. 14 is a view similar to FIG. 13 illustrating the front roller clamp in its engaged position pushing the bottom plate of the cartridge against the corresponding location pin.

After a cartridge has been inserted and the deck plate has been moved to its engaged position illustrated in FIG. 6, rotation of the load lever to its vertical position causes a curved end 228 of the fork assembly 182 to engage the small arm 220 and push it from its position illustrated in FIG. 13 to its position illustrated in FIG. 14. This in turn raises the forward end of the main arm 192 of the roller clamp and presses the wheel 208 against the bottom plate 34 of the cartridge. Continued rotation of the load lever to its vertical position causes the wheel 208 to raise the bottom plate 34 of the cartridge against the location pin 160 of the forward reference locator 154. In the first forty-five degrees of rotation of the load lever from horizontal, the deck plate is moved into its engaged position which engages the capstan drive with the cartridge, moves the EOT/BOT sensor into operative position, and engages the head with the tape establishing the proper tape wrap angle. The last ten degrees of rotation of the load lever clamps the cartridge into alignment. The wheel 208 engages the edge 229 of the cartridge (FIG. 4) through a rectangular hole 230 (FIGS. 5 and 14) in the tray. The wheel 208 pushes the plate edge 229 of the cartridge at a forty-five degree angle, causing the outer edge of the cartridge bottom plate to be pressed against the outer edge surface of the reference locator 154 and against the reference location pin 160. The wheel of the rear roller clamp 150 similarly engages an edge 231 (FIG. 4) at approximately a forty; five degree angle and presses the bottom plate 34 of the cartridge against the reference locator 158 (FIG. 5) and its pin 160.

A flange 232 (FIGS. 13 and 14) limits the movement of the arm 220, and the upward pivoting movement of the main arm 192. A spring torsion 234 (FIG. 13) is engaged with the bracket extension 214 and the small arm 220 and biases the roller clamp 148 toward its retracted position illustrated in FIG. 13. When the load lever is moved to its horizontal position, thereby pulling the fork assembly 182 away from engagement with the small arm 220, the roller clamp automatically disengages from the cartridge and the wheel 208 drops clear of the tray 14 so that it can be withdrawn from the drive. The tray 14 has a cut-out region 236 (FIG. 5) in its right rear corner to provide the clearance that permits the rearward roller clamp 150 to engage the cartridge.

When the roller clamps engage the bottom edges of the cartridge, the wheels 208 can move down slightly as illustrated in FIG. 14 by deflecting the hairpin spring 212. Thus, the cartridge is resiliently clamped against the location pins 160 and the blocks of the reference locators 154 and 158 under the force of the hairpin springs 212. The cartridge is moved into precise alignment using wheels 208 of the roller clamps at the locations illustrated in the drawings in order to meet the applicable ANSI standard for cartridge registration.

Figure 16:
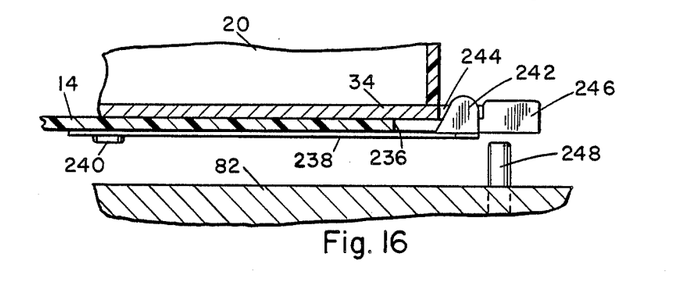
FIGS. 16 and 17 are greatly enlarged, fragmentary, vertical sectional views illustrating the mechanism of the tape drive which prevents insertion of the tape cartridge in an improper alignment.

The tape drive of the present invention further includes means to insure that the cartridge is inserted in its appropriate orientation, i.e., with the tape access cut-out 58 (FIG. 4) facing the head and the metal bottom plate 34 resting on the top surface of the tray 14. Specifically, as illustrated in FIG. 16, a leaf spring 238 has its rearward end fastened to the bottom of the tray 14 by a fastener 240. The opposite end of the leaf spring has a vertical, tapered fin 242 which normally projects upwardly adjacent the side edge of the cut-out region 236 of the tray (FIG. 5).

Figure 17:
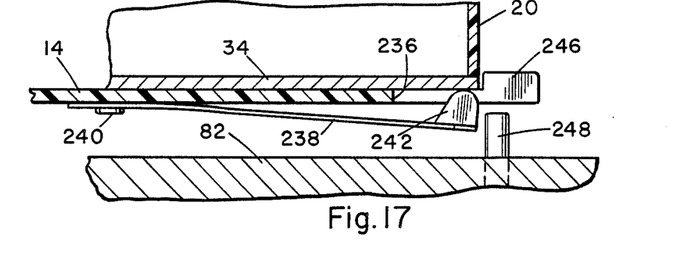

The cartridge has a cut-out 244 (FIG. 4) in its bottom plate which is located such that when the cartridge is inserted on the tray in the correct orientation, the rearward edge of the bottom plate 34 can be pushed against the abutment 246 (FIG. 5) on the end edge of the tray. The vertical fin 242 will slide into the cut-out region 244 in the bottom plate. However, if the cartridge is inserted in an improper alignment, there will be no cut-out region in the bottom plate at the correct location for receiving the fin 242. This in turn will cause the tappered fin 242 to deflect the leaf spring 238 downwardly as illustrated in FIG. 17. When this happens, the tray 14 cannot be moved from its extended position because the forward end of the leaf spring 238 will engage and be stopped by a post 248 which extends vertically from the base 82. When the cartridge is correctly inserted on the tray, the leaf spring 238 clears the top end of the post 248 as illustrated by the clearance in FIG. 16. This permits the tray and cartridge to be fully inserted.

Having described a preferred embodiment of our tape drive, it will be apparent that modifications and adaptations thereof will occur to those skilled in the art. Accordingly, the protection afforded our invention should only be limited in accordance with the scope of the following claims.

We claim:

1. A drive for an elongate, rectangular tape cartridge having a planar bottom plate and an access door along a side edge of the cartridge, comprising:

an elongate housing having an opening at a transversely extending end of thereof for having the cartridge longitudinally inserted through the opening into the housing so that the side edge of the cartridge is substantially parallel to a longitudinally extending side edge of the housing;

means for supporting the cartridge inside the housing in an initial load position;

means for opening the tape access door of the cartridge;

a magnetic head;

means for moving the magnetic head within the housing between operative engagement and disengagement with a length of magnetic tape in the cartridge exposed by opening the access door;

means engageable with the cartridge for moving the length of magnetic tape within the cartridge past the magnetic head;

means for moving the cartridge away from its initial load position in a direction generally perpendicular to the bottom plate;

locating means mounted inside the housing for engaging the cartridge when it is moved from its initial load position to thereby position the cartridge in a predetermined reference plane relative to the magnetic head;

the head moving means and the cartridge moving means including a manual actuator mounted to the transversely extending end of the housing, and linkage means for operatively coupling the head moving means and the cartridge moving means to the manual actuator; and the manual actuator including a lever and means for mounting the lever to the transversely extending end of the housing for rotational movement about an axis extending substantially parallel to the longitudinally extending side edge of the housing, the lever being rotatable between a locked position in which the lever obstructs the opening in the housing and prevents the cartridge from being withdrawn through the opening to an unlocked position in which the lever is clear of the opening and the cartridge can be withdrawn through the opening.

2. A drive according to claim 1 wherein the cartridge moving means includes a plurality of clamp mechanisms.

3. A drive according to claim 1 wherein locating means includes a plurality of pins for engaging the bottom plate of the cartridge, the positions of the pins being individually adjustable to enable the orientation of the reference plane to be adjusted relative to the magnetic head.

4. A drive according to claim 2 wherein the clamp mechanisms each include a plurality of pivotally connected arms and a roller supported at an outer end of one of the arms for engaging the bottom plate of the cartridge.

5. A drive according to claim 3 wherein there are three pins to establish the location of the reference plane by triangulation.

6. A drive according to claim 2 wherein the clamp mechanisms engage the side edge of the cartridge and tilt the cartridge away from its initial load position into engagement with the locating means.

7. A drive according to claim 1 wherein the width of the cartridge when its door is fully open is greater than the width of the housing.

8. A drive according to claim 1 and further comprising means for preventing full insertion of the cartridge into the housing through the opening unless the cartridge is oriented in a predetermined manner.

9. A drive for an elongate, rectangular tape cartridge having a planar bottom plate and an access door along a side edge of the cartridge, comprising:

an elongate housing having an opening at a transversely extending end of thereof for having the cartridge longitudinally inserted through the opening into the housing so that the side edge of the cartridge is substantially parallel to a longitudinally extending side edge of the housing;

means for supporting the cartridge inside the housing in an initial load position;

means for opening the tape access door of the cartridge;

a mounting member;

means for pivotally mounting a first portion of the mounting member within the housing so that a second portion of the mounting member can move toward and away from a length of magnetic tape in the cartridge exposed by opening the access door;

a magnetic head;

means for mounting the magnetic head on the second portion of the mounting member for engaging the magnetic tape in the cartridge upon pivoting the second portion of the mounting member toward the cartridge and for moving the head back and forth across the tape in a direction generally transverse to the length of the tape;

means mounted on the second portion of the mounting member and engageable with the cartridge upon movement of the second portion of the mounting member toward the cartridge for moving the length of magnetic tape within the cartridge past the magnetic head;

means for moving the mounting member to engage and disengage the head with the tape and the moving means with the cartridge;

means for moving the cartridge away from its initial load position in a direction generally perpendicular to the bottom plate;

locating means mounted inside the housing for engaging the cartridge when it is moved from its initial load position to thereby position the cartridge in a predetermined reference plane relative to the magnetic head;

the mounting member moving means and the cartridge moving means including a manual actuator mounted to the transversely extending end of the housing, and linkage means for operatively coupling the mounting member moving means and the cartridge moving means to the manual actuator; and the manual actuator including a lever and means for mounting the lever to the transversely extending end of the housing for rotational movement about an axis extending substantially parallel to the longitudinally extending side edge of the housing, the lever being rotatable between a locked position in which the lever obstructs the opening in the housing and prevents the cartridge from being withdrawn through the opening to an unlocked position in which the lever is clear of the opening and the cartridge can be withdrawn through the opening.

10. A drive according to claim 9 wherein the cartridge moving means includes a plurality of clamp mechanisms.

11. A drive according to claim 9 wherein locating means includes a plurality of pins for engaging the bottom plate of the cartridge, the positions of the pins being individually adjustable to enable the orientation of the reference plane to be adjusted relative to the magnetic head.

12. A drive according to claim 10 wherein the clamp mechanisms each include a plurality of pivotally connected arms and a roller supported at an outer end of one of the arms for engaging the bottom plate of the cartridge.

13. A drive according to claim 11 wherein there are three pins to establish the location of the reference plane by triangulation.

14. A drive according to claim 10 wherein the clamp mechanisms engage the side edge of the cartridge and tilt the cartridge away from its initial load position into engagement with the locating means.

15. A drive according to claim 9 wherein the width of the cartridge when its door is fully open is greater than the width of the housing.

16. A drive according to claim 9 and further comprising means for preventing full insertion of the cartridge into the housing through an opening unless the cartridge is oriented in a predetermined manner.

* * * * *